United States Patent
Li et al.

(10) Patent No.: US 8,559,867 B2
(45) Date of Patent: Oct. 15, 2013

(54) LOAD STATUS INDICATOR FOR MULTIHOP RELAY SYSTEM USING DISTRIBUTED SCHEDULING

(75) Inventors: Zhenhong Li, Shanghai (CN); Haifeng Wang, Shanghai (CN)

(73) Assignee: Nokia Corporation, Espoo (FI)

( * ) Notice: Subject to any disclaimer, the term of this patent is extended or adjusted under 35 U.S.C. 154(b) by 268 days.

(21) Appl. No.: 13/060,039

(22) PCT Filed: Aug. 19, 2009

(86) PCT No.: PCT/IB2009/053658
§ 371 (c)(1),
(2), (4) Date: Feb. 21, 2011

(87) PCT Pub. No.: WO2010/020953
PCT Pub. Date: Feb. 25, 2010

(65) Prior Publication Data
US 2011/0151774 A1    Jun. 23, 2011

Related U.S. Application Data

(60) Provisional application No. 61/189,626, filed on Aug. 21, 2008.

(51) Int. Cl.
*H04B 3/36* (2006.01)
*H04B 1/60* (2006.01)

(52) U.S. Cl.
USPC .................................................. 455/7; 455/9

(58) Field of Classification Search
USPC ................. 455/7–9, 13.1, 453, 456.1, 519
See application file for complete search history.

(56) References Cited

U.S. PATENT DOCUMENTS

| 4,206,443 A * | 6/1980 | Britton .................... 340/3.43 |
| 8,009,615 B2 * | 8/2011 | Krishnakumar et al. ..... 370/328 |
| 2007/0025738 A1* | 2/2007 | Moore ...................... 398/189 |
| 2008/0084856 A1* | 4/2008 | Ramachandran ............ 370/342 |
| 2008/0117823 A1* | 5/2008 | Krishnakumar et al. ..... 370/236 |

OTHER PUBLICATIONS

IEEE P802.16j/D6, Draft Amendment to IEEE Standard for Local and Metropolitan Area Networks, Part 16: Air Interface for Fixed and Mobile Broadband Wireless Access Systems, Multihop Relay Specification, Jul. 23, 2008, (314 pages).

* cited by examiner

*Primary Examiner* — Ping Hsieh
*Assistant Examiner* — Xin Jia
(74) *Attorney, Agent, or Firm* — Harrington & Smith

(57) ABSTRACT

A method includes receiving at a relay node a load status indicator from a subordinate relay node, determining a load status of the relay node and forwarding the received load status indicator to a super-ordinate node if the determined load status does not indicate an overload condition, otherwise if the determined load status does indicate an overload condition sending a load status indicator of the relay node to the superordinate node. Another method includes, in a multihop relay network having a plurality of relay nodes, receiving over a communication link at a network access node a load status indicator from a relay node, the load status indicator identifying a nearest relay node, if any, at which a current load exceeds a threshold; and using the received load status indicator at least when making a network admission decision for a user equipment.

11 Claims, 5 Drawing Sheets

Table 1 Load status indicator flow for Case A

| Relay station load | Relay capacity vs. load | Load status indicator |
|---|---|---|
| R5=U7+U8+U9 | $T_5^*C5 <= R5$ | D3 |
| R3=U3+U4+ R5 | $T_3^*C3 <= R3$ | D2 |
| R2=R3+R4+U5 | $T_2^*C2 <= R2$ | D1 |

FIGURE 2

Table 2 Load status indicator flow for Case B

| Relay station load | Relay capacity vs. load | Load status indicator |
|---|---|---|
| R5=U7+U8+U9 | $T_5^*C5 <= R5$ | D3 |
| R3=U3+U4+ R5 | $T_3^*C3 >= R3$ | D3 |
| R2=R3+R4+U5 | $T_2^*C2 >= R2$ | D3 |

FIGURE 3

Table 3 Load status indicator flow for Case C

| Relay station load | Relay capacity vs. load | Load status indicator |
|---|---|---|
| R5=U7+U8+U9 | $T_5^*C5 <= R5$ | D3 |
| R3=U3+U4+ R5 | $T_3^*C3 <= R3$ | D2 |
| R2=R3+R4+U5 | $T_2^*C2 >= R2$ | D2 |

FIGURE 4

Table 4 Load status indicator encoding example for multi-hop relay networks

| Link Distance | OI | Code | Code# |
|---|---|---|---|
| Any Distance | 0 (No overload) | 000 | D0 |
| 1 | 1 (overload) | 001 | D1 |
| 2 | 1 (overload) | 010 | D2 |
| 3 | 1 (overload) | 011 | D3 |
| 4 | 1 (overload) | 100 | D4 |
| 5 | 1 (overload) | 101 | D5 |
| 6 | 1 (overload) | 110 | D6 |
| 7 | 1 (overload) | 111 | D7 |

FIGURE 5

LOAD STATUS INDICATOR FOR MULTIHOP RELAY SYSTEM USING DISTRIBUTED SCHEDULING

RELATED APPLICATION

This application was originally filed as PCT Application No. PCT/IB2009/053658 on Aug. 19, 2009 and claims priority to U.S. Provisional Application No. 61/189,626 filed on Aug. 21, 2008, which is incorporated herein by reference in its entirety.

TECHNICAL FIELD

The exemplary and non-limiting embodiments of this invention relate generally to wireless communication systems, methods, devices and computer programs and, more specifically, relate to operation of wireless multihop relay networks.

BACKGROUND

Various abbreviations that appear in the specification and/or in the drawing figures are defined as follows:
BS base station
RS relay station
QoS quality of service
SIR signal to interference ratio
UE user equipment Most existing and standardized systems have been designed for bidirectional communication between a central BS and a UE directly linked to the BS. Relaying is generally considered as a method to ensure capacity improvement and coverage extension in cellular systems. The additional communication traffic between a mobile station and a relay intermediately inserted into a link between a remote UE (R-UE) and the BS requires additional considerations regarding the uplink signaling transmission.

Typically in relay networks there are two main scheduling modes that can be used, i.e., centralized and distributed scheduling modes. General reference in this regard may be made to IEEE P802.16j/D6, Draft Amendment to IEEE Standard for Local and Metropolitan Area Networks, Part 16: Air Interface for Fixed and Mobile Broadband Wireless Access Systems, Multihop Relay Specification, 2008-07-23. For the centralized scheduling mode the BS determines the bandwidth allocations for all the links (access and relay) in the cell. Thus, before a UE can transmit a packet to the BS, the bandwidth request of the UE needs to first reach the BS, which then creates the bandwidth allocations on the links along the path from the UE to the BS. For the distributed scheduling mode each BS and relay station (RS) individually determines the bandwidth allocations on the associated controlled links, and creates its own local resource allocations reflecting these decisions.

The distributed scheduling mode typically has less signaling overhead associated therewith, and further has the capability to respond more rapidly to channel variations that the centralized scheduling mode, and is thus desirable for use in a mobile relay network.

In those relay networks that operate with the centralized scheduling mode a RS forwards all bandwidth requests to the BS. The RS is defined so as to not combine bandwidth request amounts from different sources, since the BS preferably needs to have knowledge of the details of each bandwidth request in order to assign the uplink bandwidth along the proper route. As a result the BS is aware of the bandwidth request and bandwidth allocation of each node under its control.

In those relay networks that employ the distributed scheduling mode the RS may receive the bandwidth requests from its subordinate stations, and it may combine the bandwidth requests that arrive from the subordinate stations together with the bandwidth needs of queued data packets into one bandwidth request per QoS class. A given RS can then transmit an aggregate or incremental bandwidth request to a superordinate station (a RS in the path that is closer to the BS). Consequently, the BS is only aware of the bandwidth requests from its subordinate stations, and is not aware of the bandwidth requests originating from individual sources. That is, the BS is not aware of the bandwidth requests and bandwidth allocations of those nodes that are not the direct subordinates of the BS.

SUMMARY

In one non-limiting aspect thereof the exemplary embodiments of this invention provide a method that comprises receiving at a relay node a load status indicator from a subordinate relay node, determining a load status of the relay node and forwarding the received load status indicator to a superordinate node if the determined load status does not indicate an overload condition, otherwise if the determined load status does indicate an overload condition sending a load status indicator of the relay node to the superordinate node.

In another non-limiting aspect thereof the exemplary embodiments of this invention provide an apparatus that comprises at least one processor and at least one memory including computer program code. The at least one memory and the computer program code are configured to, with the at least one processor, cause the apparatus at least to receive a load status indicator from a subordinate relay node; determine a load status associated with the apparatus; and forward the received load status indicator to a superordinate node if the determined load status does not indicate an overload condition otherwise, if the determined load status does indicate an overload condition, send a load status indicator of the apparatus to the superordinate node.

In another non-limiting aspect thereof the exemplary embodiments of this invention provide a method that comprises, in a multihop relay network having a plurality of relay nodes, receiving over a communication link at a network access node a load status indicator from a relay node, the load status indicator identifying a nearest relay node, if any, at which a current load exceeds a threshold; and making a network admission decision for a user equipment by using the received load status indicator.

In a further non-limiting aspect thereof the exemplary embodiments of this invention provide an apparatus that comprises at least one processor and at least one memory including computer program code. The at least one memory and the computer program code are configured to, with the at least one processor, cause the apparatus at least to receive over a communication link a load status indicator from a relay node, the load status indicator identifying a nearest relay node, if any, at which a current load exceeds a threshold; and make a network admission decision for a user equipment by using the received status indicator.

BRIEF DESCRIPTION OF THE DRAWINGS

In the attached Drawing Figures:

FIGS. 2-4 show Tables 1-3, respectively, and depict load status indicator flow for three exemplary use cases A-C, respectively.

FIG. 5 depicts a fourth table showing an exemplary embodiment of load status indicator encoding for use in a multihop relay network (exemplary depth of 7).

DETAILED DESCRIPTION

The exemplary embodiments of this invention provide a load status indicator for use in at least the distributed scheduling mode of a relay network, more specifically the exemplary embodiments of this invention provide an uplink load status indicator for use in at least the distributed scheduling mode of a multihop relay network.

Figure 1:
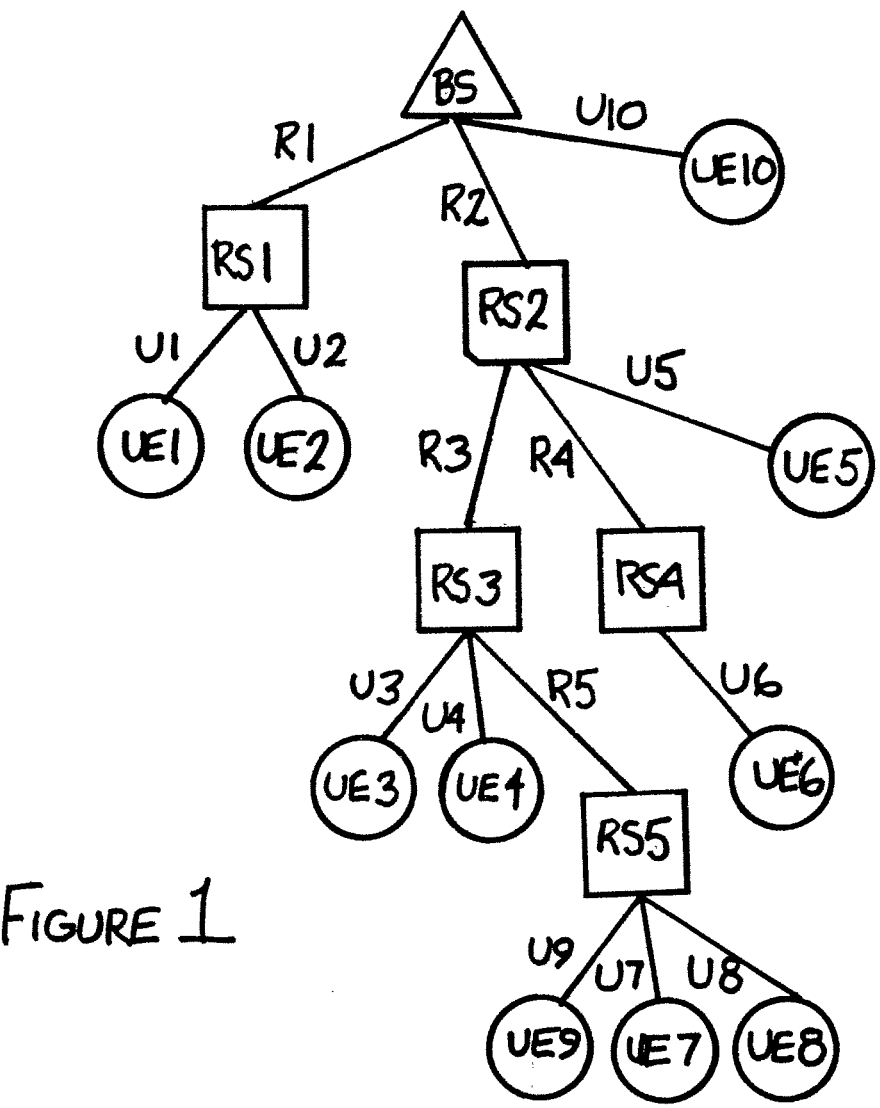
FIG. 1 shows a non-limiting example of a multihop relay network.

An example of a multihop relay system is illustrated in FIG. 1 for the distributed scheduling mode. For example, if the current load (reflecting the resource allocation) is more than a load threshold of RS5 (herein, if the current load is over the load threshold, it is referred to as an "overload") for a pre-defined time interval, there are at least three exemplary cases that can occur (using conventional techniques).

In a first case an overload in RS5 causes an overload to occur along the route BS-RS2-RS3-RS5. While the BS is aware that the overload occurs on that route, it is not aware of the actual overloaded RS.

In a second case the overload occurs only in RS5, and the superordinate station RS3 is not overloaded. In this case the BS is not aware of the overload occurring for RS5.

In a third case the overload in RS5 causes the overload only in superordinate station RS3. However, since the subordinate station (RS2) of the BS is not overloaded, the BS is not aware of the overload condition.

As the BS does not have detailed information on the uplink load status in every link, the BS is not capable in the conventional cases of optimally selecting the correct node to handle a potential handover for load balancing or admission control purposes.

In the exemplary embodiments of this invention the RS sends an event triggered or a periodic uplink load status indicator to its superordinate node according to an adjustable load threshold. If the superordinate node is not overloaded, then the superordinate node forwards the received load status indicator in an upstream direction (towards the BS or more generally towards a network access node). However, if the superordinate node is overloaded, then it sends its own load status indicator in the upstream direction. The load status indicator indicates the relevant load status, and the identity of overloaded link, to the BS. In the exemplary embodiment the relay network may be a multihop relay network that uses the distributed scheduling mode, and the received load status indicator(s) assist the BS in making correct decisions of a new UE entry.

The uplink load status indicator may be implemented based on link distance/depth which may reflect the number of hops in the multihop relay system. The uplink load status indicator identifies the nearest link on which the current load is over the predefined threshold. The uplink load status indicator can be formulated as in Table 4 shown in FIG. 5 for a depth up to, for example, 7 (the depth may be extended beyond 7 if desired).

Describing now the exemplary embodiments of this invention in further detail, define $T_i$ as a threshold factor, e.g., $T_i=0.8$, and define C as the total uplink resource capacity for a particular RS. It is assumed that the threshold factor is configurable, although a fixed threshold factor may be used as well. Uj and Rj in FIG. 1 denote a resource request from a UE (e.g., UEs 1-10) and from a RS (e.g., RSs 1-5), respectively.

Case A

Reference is made to Table 1 in FIG. 2 for showing the load status indicator flow for Case A.

In this case it is assumed that the total load in RS5 is over the capacity threshold in BS-RS2-RS3-RS5. The load status indicators of the RSs 5, 3 and 2 are summarized in Table 1. RS5 sends the code D3 to its superordinate node RS3. As RS3 is also over the load capacity threshold, RS3 replaces D3 with D2 in the message sent to RS2. In the same manner RS2 sends D1 to the BS (since R2 is also overloaded). The UEx entry to RS5 is rejected, and the UEx entry to other links (except BS-RS2-RS3-RS5) with lower load may be considered by taking into account other handover/admission control criteria.

Case B:

Reference is made to Table 2 in FIG. 3 for showing the load status indicator flow for Case B.

In this case the total load in RS5 exceeds the capacity threshold, while an overload does not occur in RS3 and RS2. In this case RS5 sends the code D3 to its superordinate station RS3. As RS3 is not over the load capacity threshold, RS3 forwards the received code D3 to RS2, and RS2 forwards D3 to the BS. In this case the BS has knowledge of the overload condition of RS5 and the UEx entry to RS5 is rejected, while the UEx entry to RS2 or RS3 may be considered by taking into account other handover/admission control criteria.

Note that without the use of the load indicator in accordance with these exemplary embodiments it is possible that the UEx would be admitted to RS5, and the lower load relay nodes RS3 and RS2 would not be considered as potential candidates. One result of this would be a need to make frequent bandwidth reallocations for the relay nodes, and potentially more handovers.

Case C:

Reference is made to Table 3 in FIG. 4 for showing the load status indicator flow for Case C.

In this case, the total load in RS5 exceeds the capacity threshold, and the same condition exists in RS3. In this case RS5 sends the code D3 to its superordinate node RS3. As RS3 is also over the load capacity threshold, RS3 replaces the received code D3 with its own code D2 and sends it to RS2. Since RS2 does not exceed the load threshold, RS2 forwards the received code D2 to the BS. In this case the UEx entry to RS3 and RS5 is rejected, while the UEx entry to RS2 may be considered by taking into account other handover/admission control criteria.

Note that without the use of the load indicator in accordance with these exemplary embodiments it is possible that the UEx would be admitted to RS5 or to RS3, and the lower load relay node RS2 would not be considered as a potential candidate. As was indicated above, one result of this would be a need to make frequent bandwidth reallocations for the relay nodes, and potentially more handovers.

Table 4 in FIG. 5 shows an exemplary embodiment of load status indicator encoding for use in the multihop relay network (for the exemplary depth of 7 using three bits). In Table 5 the abbreviation OI indicates overload indicator.

In general, the threshold of a particular RS may be adjusted by the superordinate station or by the BS. The criterion for adjusting a particular threshold up or down may be based on, as a non-limiting example, the link quality as represented by, for example, the SIR. Note that each RS may thus operate with a different threshold, such as the thresholds $T_2$, $T_3$ and $T_5$ shown in FIGS. 2, 3 and 4.

In general, a given one of the RSs may be considered to be in an overload condition when it has no available radio resources, such as spreading codes, frequency/time resources, timeslots or any other radio-related resource(s) that are needed for conducting communication.

In general, the use of these exemplary embodiments provides a total load status to the superordinate station (load status flows upstream from child node to parent node). Various components of the total load, such as load by QoS class, may be taken into account by the admission control criteria noted above.

Figure 6:
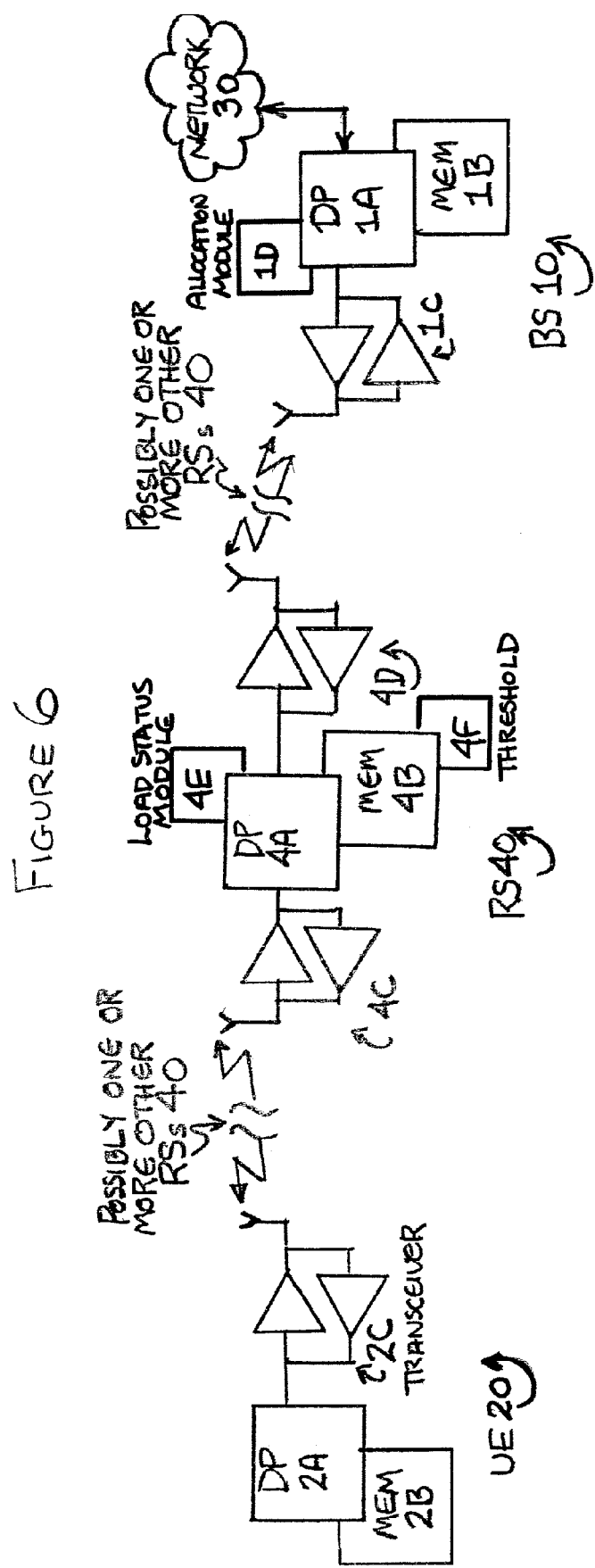
FIG. 6 is a simplified block diagram of a various apparatus that can be used to implement a multihop relay network that operates in accordance with these exemplary embodiments.

FIG. 6 is a simplified block diagram of various apparatus that can be used to implement the exemplary embodiments of this invention. FIG. 6 shows an exemplary UE 20, an exemplary RS 40 and an exemplary BS 10 that provides connectivity to a data communications network 30, such as the internet. The BS 10 may thus be considered as a network access node. The BS 10 includes a controller, such as at least one data processor (DP 1A) or more generally a computer that is connected with at least one memory 1B that stores computer program code and data. A resource allocation/network entry module 1D is responsive to uplink load status indicators received through a suitable wireless transceiver 1C from the RS 40, as described above. The RS 40 also includes a controller, such as at least one data processor (DP 4A) or more generally a computer that is connected with at least one memory 4B that stores computer program code and data. A load status module 4E operates with a load threshold 4F (that may be stored in the memory 4B) to receive uplink load status indicators from subordinate RSs (if any) and to send (or forward, depending on the load status of the RS 40) an appropriate uplink load status indicator to a superordinate RS (or directly to the BS 10 if the RS 40 is first RS in the link path). For this purpose the RS 40 includes at least one, and may include more than one, wireless transceivers 4C, 4D. There may be a separate transceiver provided for communication with UEs 20. Shown for completeness is also the UE 20, which is also assumed to include a controller, such as a data processor (DP 2A) or more generally a computer that is connected with memory 2B that stores computer program instructions and data. The UE 20 includes at least one transceiver 2c configured for bidirectional wireless communication with the RS 40, or directly with the BS 10 (see the UE 10 in FIG. 1).

At least one of the programs stored in memories 1B, 4B is assumed to include program instructions that, when executed by the associated DP, enable the electronic device to operate in accordance with the exemplary embodiments of this invention. That is, the exemplary embodiments of this invention may be implemented at least in part by computer software executable by the DP 1A of the BS 10 and by the DP 4A of the RS 40, or by hardware, or by a combination of software and hardware (and firmware).

The various embodiments of the UE 20 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memories 1B, 2B and 4B may be of any type suitable to the local technical environment and may be implemented using any suitable data storage technology, such as semiconductor based memory devices, flash memory, magnetic memory devices and systems, optical memory devices and systems, fixed memory and removable memory. The DPs 1A, 2A and 4A may be of any type suitable to the local technical environment, and may include one or more of general purpose computers, special purpose computers, microprocessors, digital signal processors (DSPs) and processors based on a multicore processor architecture, as non-limiting examples.

There are a number of advantages that can be realized by the use of the exemplary embodiments of this invention. For example, the BS 10 is made aware of the intra-cell load situation by the receipt of uplink load status indicators. Consequently the spectrum can be efficiently used for the distributed scheduling mode, and excessive numbers of resource reassignments can be avoided by immediately allocating a new UE 20 to a more lightly loaded (not overloaded) RS 40, while taking into account other relevant handover/admission control criteria.

Figure 7:
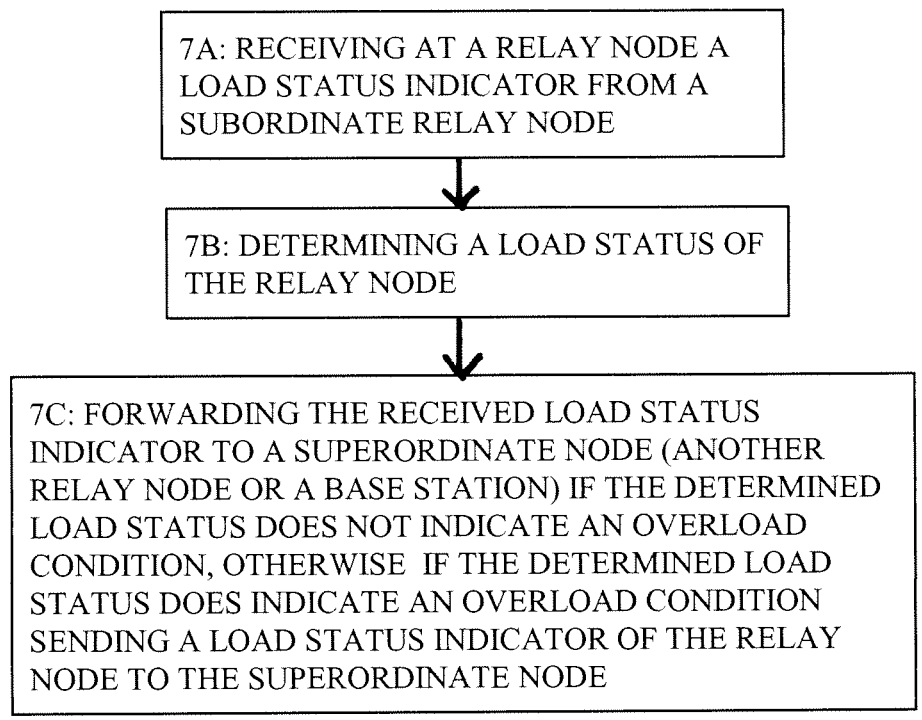
FIG. 7 is a logic flow diagram that illustrates the operation of a method, and a result of execution of computer program instructions, in accordance with the exemplary embodiments of this invention.

Based on the foregoing it should be apparent that the exemplary embodiments of this invention provide a method, apparatus and computer program product(s) to provide load indicators in a relay network, such as one operating in accordance with a distributed scheduling mode. FIG. 7 is a logic flow diagram that illustrates the operation of a method, and a result of execution of computer program instructions, in accordance with the exemplary embodiments of this invention. At Block 7A there is a step of receiving at a relay node a load status indicator from a subordinate relay node. At Block 7B there is a step of determining a load status of the relay node. At Block 7C there is a step of forwarding the received load status indicator to a superordinate node (another relay node or a base station) if the determined load status does not indicate an overload condition, otherwise if the determined load status does indicate an overload condition sending a load status indicator of the relay node to the superordinate node.

The method of the preceding paragraph, where a value of the load status indicator, when received by the base station, is expressive of a last relay node in an associated link path that is experiencing an overload condition (if any).

Figure 8:
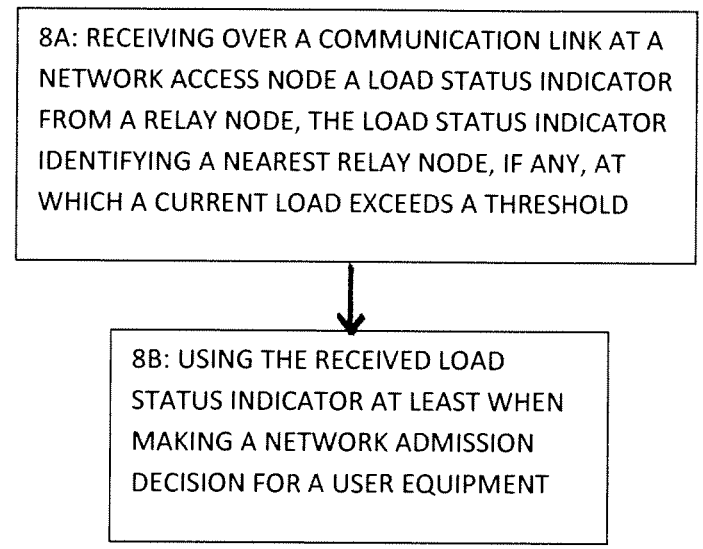
FIG. 8 is a logic flow diagram that illustrates the operation of a method, and a result of execution of computer program instructions, further in accordance with the exemplary embodiments of this invention.

FIG. 8 is a logic flow diagram that illustrates the operation of a method, and a result of execution of computer program instructions, further in accordance with the exemplary embodiments of this invention. At Block 8A there is a step of receiving over a communication link at a network access node a load status indicator from a relay node, the load status indicator identifying a nearest relay node, if any, at which a current load exceeds a threshold. At Block 8B there is a step of making a network admission decision for a user equipment by using the received load status indicator.

The various blocks shown in FIGS. 7 and 8 may be viewed as method steps, and/or as operations that result from operation of computer program code, and/or as a plurality of coupled logic circuit elements constructed to carry out the associated function(s). It is understood that at least some of the various operations associated with the methods may be performed in other than the order indicated. As an example, the operations expressed in Blocks 7A and 7B of FIG. 7 may be performed in the opposite order to that indicated.

The exemplary embodiments of this invention also pertain at least in part to an apparatus that comprises means for receiving at a relay node a load status indicator from a subordinate relay node; means for determining a load status of the relay node; and means for forwarding the received load status indicator to a superordinate node if the determined load status does not indicate an overload condition, otherwise if the determined load status does indicate an overload condition, for sending a load status indicator of the relay node to the superordinate node.

The exemplary embodiments of this invention also pertain at least in part to an apparatus that comprises, in a multihop relay network having a plurality of relay nodes, means for receiving over a communication link at a network access node a load status indicator from a relay node, the load status indicator identifying a nearest relay node, if any, at which a current load exceeds a threshold; and means for making a network admission decision for a user equipment by using the received load status indicator.

The exemplary embodiments of this invention also pertain at least in part to a computer-readable memory medium that stores a computer software program that, when executed by at least one computer, results in operations that comprise receiving at a relay node a load status indicator from a subordinate relay node, determining a load status of the relay node, and forwarding the received load status indicator to a superordinate node if the determined load status does not indicate an overload condition, otherwise if the determined load status does indicate an overload condition sending a load status indicator of the relay node to the superordinate node.

The exemplary embodiments of this invention also pertain at least in part to a computer-readable memory medium that stores a computer software program that, when executed by at least one computer, results in operations that comprise receiving over a communication link at a network access node a load status indicator from a relay node, the load status indicator identifying a nearest relay node, if any, at which a current load exceeds a threshold; and making a network admission decision for a user equipment by using the received load status indicator.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied in whole or in part as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of a wireless multi-hop relay network operating with the distributed scheduling modality it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
receiving at a relay node a load status indicator from a subordinate child relay node;
determining a load status of the relay node, where the load status is determined by comparing a current load of the relay node with a threshold value;
forwarding the received load status indicator to a superordinate parent node if the determined load status does not indicate an overload condition for the relay node, otherwise if the determined load status does indicate an overload condition for the relay node sending a load status indicator of the relay node to the superordinate node.

2. The method of claim 1, where the superordinate parent node is one of a relay node or a network access node.

3. The method as in claim 1, where the load status indicator is based on a link distance/depth that reflects a number of hops in a multihop relay network, and identifies a nearest link on which a current load exceeds the threshold value.

4. The method of claim 3, where the threshold value is an adjustable threshold value.

5. The method of claim 3, where the threshold value is adjustable based on link quality.

6. The method of claim 3, where the load status indicator is expressed as an n-bit value, where n relates to a depth of the multihop relay network.

7. An apparatus comprising:
at least one processor and at least one memory including computer program code, the at least one memory and the computer program code configured to, with the at least one processor, cause the apparatus at least to
receive a load status indicator from a subordinate child relay node;
determine a load status associated with the apparatus, where the load status is determined by comparing a current load of the apparatus with a threshold value; and
forward the received load status indicator to a superordinate parent node if the determined load status does not indicate an overload condition for the apparatus otherwise, if the determined load status does indicate an overload condition for the apparatus, send a load status indicator of the apparatus to the superordinate parent node.

8. The apparatus of claim 7, where the superordinate parent node is one of a relay node or a network access node.

9. The method as in claim 7, where the load status indicator is based on a link distance/depth that reflects a number of hops in a multihop relay network, and identifies a nearest link on which a current load exceeds the threshold value.

10. The apparatus of claim 9, where the threshold value is adjustable based on at least link quality.

11. The apparatus of claim 9, where the load status indicator is expressed as an n-bit value, where n relates to a depth of the multihop relay network.

* * * * *